(12) United States Patent
Takeuchi et al.

(10) Patent No.: US 7,160,610 B2
(45) Date of Patent: *Jan. 9, 2007

(54) DECORATIVE MATERIAL

(75) Inventors: Hajime Takeuchi, Tokyo-to (JP); Keisuke Endo, Tokyo-to (JP); Shoichi Kitagawa, Tokyo-to (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/900,881

(22) Filed: Jul. 28, 2004

(65) Prior Publication Data

US 2005/0003170 A1 Jan. 6, 2005

Related U.S. Application Data

(63) Continuation of application No. 09/962,521, filed on Sep. 25, 2001, now Pat. No. 6,790,525.

(30) Foreign Application Priority Data

Sep. 28, 2000 (JP) .............................. 2000-296038

(51) Int. Cl.
  *B32B 27/00* (2006.01)
  *B32B 33/00* (2006.01)
(52) U.S. Cl. .................. 428/335; 428/411.1; 428/542; 428/913.3
(58) Field of Classification Search ............. 428/411.1, 428/542.6, 913.3, 914, 335
See application file for complete search history.

(56) References Cited

U.S. PATENT DOCUMENTS

| 4,856,857 A | * | 8/1989 | Takeuchi et al. ................ 359/3 |
| 6,790,525 B1 | * | 9/2004 | Takeuchi et al. ............ 428/339 |
| 2003/0068491 A1 | * | 4/2003 | Otaki et al. ................. 428/343 |

FOREIGN PATENT DOCUMENTS

JP 2000320114 A * 11/2000

OTHER PUBLICATIONS

Encyclopedia of Chemical Technology, 4th Edition, Supplement Volume, Wood-Based Composites and Laminates: Plywood, pp. 771-782, Mar. 2001.*

* cited by examiner

*Primary Examiner*—Ramsey Zacharia

(74) *Attorney, Agent, or Firm*—Ladas & Parry LLP

(57) ABSTRACT

A decorative material D having an intermediate resin layer and a surface protective layer comprising a crosslinked resin, the layers being laminated in this order on a substrate 1, wherein the temperature dependency characteristics of loss elastic modulus E" (a measuring frequency of 10 Hz) determined by a dynamic viscoelasticity method of the intermediate resin layer has a peak at least at a temperature under room temperature Tr. Further, it is preferable that the value of storage elastic modulus E" is in a range of $1\times10^7$ to $2\times10^9$ Pa in the region of the room temperature. Also, it is preferable that loss elastic modulus E" has the peak Pb in the temperature range over the room temperature.

4 Claims, 2 Drawing Sheets

DECORATIVE MATERIAL

The present application is a continuation of U.S. Ser. No. 09/962,521 filed on Sep. 25, 2001, now granted as U.S. Pat. No. 6,790,525.

BACKGROUND OF THE INVENTION

The present invention relates to decorative materials to be used for building interior materials such as walls, surface materials of furniture and fixture such as doors and vehicle interior materials, and particularly, to decorative materials which show excellent abrasion resistance because of their structure having a surface protective layer comprising a crosslinked resin.

Heretofore, decorative materials, such as decorative sheets, for applications such as those described above are usually required to have abrasion resistance. Thus, decorative materials whose surface protective layers are formed from two-component curing urethane resin paints, ionizing-radiation-curing resin paints and the like are practically used today.

(1) For example, JP-B 49-31033 and JP-B 4-22694 disclose a decorative material wherein a pattern layer is formed on a substrate by printing and then a surface protective layer is further formed, the surface protective layer comprising a resin resulting from a procedure comprising applying an ionizing-radiation-curing resin paint of unsaturated polyester type, acrylate type or the like to form a coating film, and then curing the film by crosslinking with electron beams.

(2) Furthermore, for the case where a greater abrasion resistance is required, the published specification of Japanese Patent No.2740943 discloses the addition of spherical particles such as spherical α-alumina as an abrasion reducing agent to an ionizing-radiation-curing resin forming a surface protective layer.

However, even though a surface protective layer is formed of a crosslinked resin like in the above (1), abrasion resistance can not be improved beyond a certain limit and only insufficient abrasion resistance may be obtained. The addition of hard inorganic particles as an abrasion reducing agent to the resin of a surface protective layer like in the above (2) can improve abrasion resistance, but it may cause a problem of generating a rough feeling in the surface of the surface protective layer. Moreover, in the approach of the above (2), a problem, which is caused by the addition of the abrasion reducing agent, that a plate, a doctor blade and the like become easy to be worn during the formation of a surface protective layer is solved by the use of spherical particles as an abrasion reducing agent. The use of such a specific abrasion agent, however, may also cause a high cost problem.

SUMMARY OF THE INVENTION

The problem to be solved by the present invention is to provide to a decorative material with excellent abrasion resistance.

In order to solve the above problem, the decorative material of the present invention has a structure, that is, a decorative material comprising an intermediate resin layer and a surface protective layer including a crosslinked resin, the layers being laminated in this order on a substrate, wherein a temperature dependency characteristic at a measuring frequency of 10 Hz of loss elastic modulus determined by a dynamic viscoelasticity method of the intermediate resin layer has a peak at least at a temperature lower than room temperature.

If, as described above, an intermediate resin layer whose dynamic viscoelastic characteristic is specified to have a peak of loss elastic modulus in the region under room temperature is provided, an excellent abrasion resistance can be achieved without adding any abrasion reducing agent such as inorganic particles to a surface protective layer. This is probably because the intermediate resin layer which became moderately soft at room temperature where an abrasion stress is added serves as a cushion. In other words, it is probable that when an adequate elastic restoring force is applied and simultaneously an external force (abrasion stress) that wears a surface is applied to a surface protective layer, an intermediate layer underlying the surface protective layer absorbs and relieves the external stress by dispersing the external stress to a large area (volume) to reduce it and further converting it to heat to dissipate, and as a result, the surface protective layer becomes difficult to be worn and its abrasion resistance is improved. For this reason, the necessity of adding abrasion reducing agents such as inorganic particles to the surface protective layer may be eliminated depending upon the degree of abrasion resistance required and it will become possible to avoid a rough feeling of a surface and abrasion of plates occurring during the formation of a surface protective layer, which would occur when abrasion reducing agents were added.

Moreover, the decorative material of the present invention may further have a structure where the value of storage elastic modulus determined by a dynamic viscoelasticity method of the intermediate resin layer is $1 \times 10^7$ to $2 \times 10^9$ Pa in the range of room temperature, based on the above-mentioned structure.

By adopting the structure of specifying the dynamic viscoelastic characteristics also about the storage elastic modulus, excellent abrasion resistance can be obtained more certainly without adding any abrasion reducing agent such as inorganic particles to the surface protective layer. This is probably because an intermediate layer can be provided with such a moderate elastic restoring force that a surface protective layer is prevented from excessive deformation and a surface layer is allowed to recover from its deformation and the surface hardness of the surface protective layer is maintained.

Moreover, the decorative material of the present invention may further have a structure where the temperature dependency characteristic at a measuring frequency of 10 Hz of loss elastic modulus determined by the dynamic viscoelasticity method of the intermediate resin layer further has a peak at a temperature higher than room temperature.

By adopting the structure of specifying to have a peak of loss elastic modulus also in the temperature region higher than that where decorative materials are practically used, excellent abrasion resistance can be obtained more certainly without adding any abrasion reducing agent such as inorganic particles to the surface protective layer. This is probably because the peaks of the temperature dependency characteristic of loss elastic modulus appearing, respectively, at a temperature under room temperature and at a temperature over room temperature make storage elastic modulus at room temperature easy to fall within a moderate region, thereby providing to the intermediate resin layer such a moderate elastic restoring force that the surface protective layer is prevented from excessive deformation and a surface layer is allowed to recover from its deformation and the surface hardness of the surface protective layer is maintained.

According to the decorative material of the present invention, an excellent abrasion resistance can be obtained due to the intermediate resin layer having a specific dynamic viscoelastic characteristic of having a peak of loss elastic modulus under room temperature. For this reason, for some abrasion resistance required, it is not necessary to add abrasion reducing agents such as inorganic particles into a surface protective layer. For this reason, the necessity of adding abrasion reducing agents such as inorganic particles to the surface protective layer may be eliminated depending upon the degree of abrasion resistance required and it will become possible to avoid a rough feeling of a surface and abrasion of plates at the formation of the surface protective layer, which would occur when abrasion reducing agents were added.

Furthermore, by specifying the dynamic viscoelastic characteristic of the intermediate resin layer to a specific storage elastic modulus, adequate elastic restoring force required for improving abrasion resistance and for maintaining surface hardness is obtained and therefore the above-mentioned effect (1) can be obtained more certainly.

In addition to the above (1) or (2), it becomes easy to obtain adequate elasticity restoring force required for improving abrasion resistance and for maintaining surface hardness also by specifying the loss elastic modulus of the intermediate resin layer to be the dynamic viscoelastic characteristics having a peak also at a temperature over room temperature. Therefore, the above-mentioned effect (1) can be obtained more certainly.

DETAILED DESCRIPTION OF THE PREFERRED EMBODIMENTS

Hereinafter, the embodiments will be described about decorative material of the present invention.

[Outline]

Figure 1A:
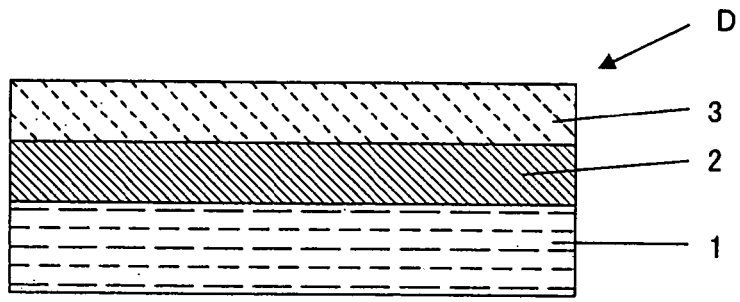
FIG. 1 includes a sectional view illustrating one embodiment of the decorative material of the present invention and an explanatory view which schematically illustrates the dynamic viscoelastic characteristics (loss elastic modulus E" and storage elastic modulus E') of the intermediate resin layer.

FIG. 1A is a sectional view showing the reference structure of the decorative material of the present invention. The decorative material D of the present invention has a structure where an intermediate resin layer 2 having the above-mentioned specific dynamic viscoelastic characteristic and a surface protective layer 3 made up of a crosslinked resin are laminated in this order on a substrate 1. The intermediate resin layer 2 is a resin layer disposed between the substrate 1 and the surface protective layer 3 and the intermediate resin layer may have a multilayer structure comprising a plurality of layers having different functions according to the application, physical properties required, etc. of the decorative material.

Figure 2:
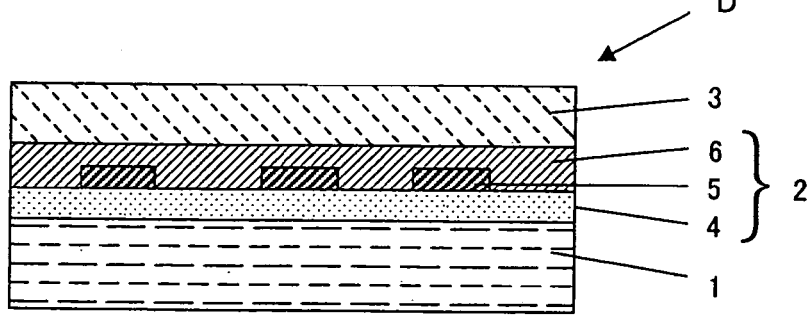
FIG. 2 is a sectional view illustrating another embodiment of the decorative material of the present invention.

Examples of such a multilayer structure include a structure, like the decorative material D illustrated using a sectional view in FIG. 2, wherein in the structure where an intermediate resin layer 2 having the above-mentioned specific dynamic viscoelastic characteristic and a surface protective layer 3 made up of a crosslinked resin are laminated on a substrate 1, the intermediate resin layer 2 is constituted of three layers, a sealer layer 4, a pattern layer 5 and a primer layer 6, sequentially from the side of the substrate 1.

Figure 1B:
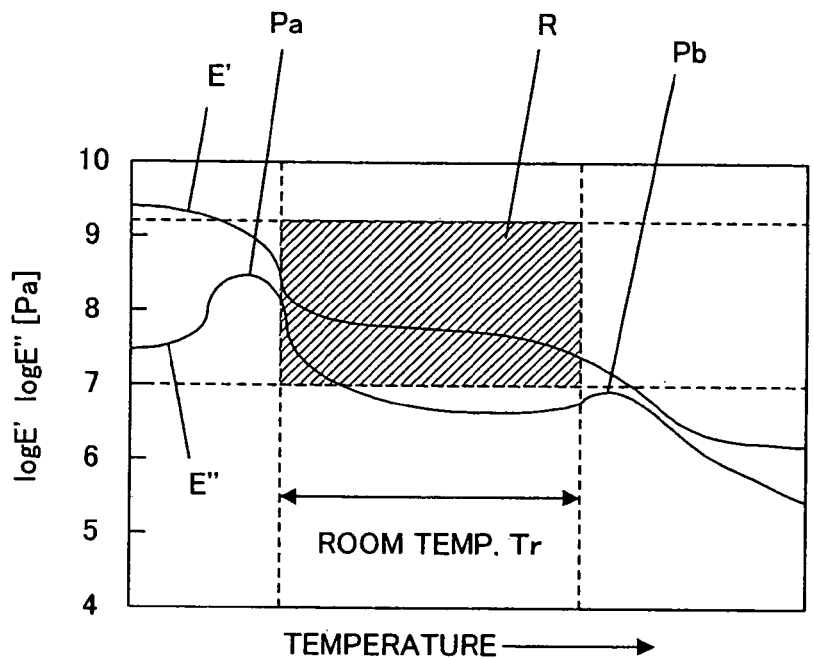

FIG. 1B is an explanatory view schematically illustrating the above-mentioned specific dynamic viscoelasticity characteristic of an intermediate resin layer. FIG. 1(B) is a chart obtained by measuring, for the intermediate resin layer, temperature dependency characteristic of loss elastic modulus E" and storage elastic modulus E' by a dynamic viscoelasticity method at a measuring frequency of 10 Hz. In the present invention, the dynamic viscoelastic characteristic is adjusted so that the temperature dependency characteristic of loss elastic modulus E" has a peak Pa at a temperature under room temperature Tr. Moreover, this chart also shows a desirable case where the temperature dependency characteristic of loss elastic modulus E" has also a peak Pb at a temperature over room temperature Tr. Furthermore, the chart also contains a temperature dependency characteristic of storage elastic modulus E' measured under the same conditions. This is also a desirable case where the storage elastic modulus E' desirably falls within the optimal region R in which the values in the region of room temperature Tr are from $1 \times 10^7$ to $2 \times 10^9$ Pa.

As mentioned above, specifying the loss elastic modulus E" or the storage elastic modulus E' as well as E" of the intermediate resin layer to specific conditions can improve abrasion resistance of a decorative material (a surface protective layer) through the viscoelastic behavior of the intermediate resin layer. It is to be noted that although such improvement in abrasion resistance can be obtained by a structure where no abrasion reducing agent is added to the surface protective layer, abrasion reducing agents or the like may be added to the surface protective layer when further improvement in abrasion resistance is required.

Hereinafter, each layer will be explained in more detail sequentially from a substrate.

[Substrate]

The substrate 1 has no particular limitations. For example, the substrate may have an optional configuration such as a sheet, a board, a three-dimensional object and the like depending upon the application of the decorative material. The material thereof is also optional.

The sheet is exemplified by paper, a resin sheet, non-woven fabric and metallic foil. Specifically, examples of the paper include tissue paper, kraft paper, titanium paper, high-grade paper, linter paper, baryta paper, parchment paper, glassine, vegetable parchment paper, paraffin paper, paperboard, coated paper, art paper, Japan paper and those impregnated with resins such as acrylic resin, urethane resin and styrene-butadiene rubber. Examples of the non-woven fabric include those comprising fibers of resin such as polyester resin and acrylic resin, inorganic fibers such as glass, carbon and asbestos. The resin sheet is exemplified by resin sheets (films) comprising resin such as polyolefin resins such as polyethylene, polypropylene, polybutene, polymethylpentene, ethylene-propylene copolymers, ethylene-propylene-butene copolymers and olefin-based thermoplastic elastomers, acrylic resins such as polymethyl (meth) acrylate, polybutyl (meth)acrylate, methyl (meth)acrylate-styrene copolymers and methyl (meth)acrylate-butyl (meth) acrylate copolymers, provided that "(meth) acrylate" means "acrylate or methacrylate", polyester resins such as polyethylene terephthalate, polybutylene terephthalate, polyethylene naphthalate, polyallylate, ethylene terephthalate-isophthalate copolymers and polyester-based thermoplastic elastomers, vinyl-based resins such as polyvinyl chloride, polyvinylidene chloride and polyvinyl alcohol, styrene-based resins such as polystyrene and acrylonitrile-butadiene-styrene copolymers (ABS resins), cellulose triacetate, cellophane and polycarbonate. Examples of the metallic foil include metallic foils made up of aluminum, iron, stainless steel and cupper. Alternatively, laminates having two or more layers comprising the same kind or different kinds of sheets selected from the above-listed various sheets.

As the board, woody boards, inorganic ceramics boards, resin boards, metallic boards and the like are mentioned. Specifically, the woody boards are exemplified by wood veneers, plywoods, laminate woods, particle boards and middle density fiber board (MDF) formed of wood (including bamboo) such as Japan cedar, pine, keyaki, oak, lauan, teak, melapi and bamboo. Examples of the inorganic ceramics boards include inorganic non-metallic boards such as cement boards e.g., gypsum boards, gypsum slag boards, calcium silicate boards, asbestos slate boards, ALC (autoclaved light-weight concrete) boards and blow-extruded cement boards, pulp cement boards, asbestos cement boards, wood chip cement boards, GRC (glass fiber reinforced concrete) boards, ceramic boards formed of earthenware, porcelain, stoneware, terra-cotta, glass and enameled ware. The resin boards are exemplified by resin boards such as those formed of thermosetting resins, e.g., phenol resins, urea resins, unsaturated polyester resins, urethane resins, epoxy resins and melamine resins as well as a variety of thermoplastic resins described as the above-mentioned material for resin sheets, and so-called FRP (fiber reinforced plastic) boards such as those obtained by impregnating various kinds of fibrous substrates, such as glass fiber non-woven fabric, cloth and paper, with resin such as phenol resins, urea resins, unsaturated polyester resins, urethane resins, epoxy resins, melamine resins and diallyl phthalate resin and curing the resins to combine the substrates and the resins. The metallic boards are exemplified by iron boards, zinc-plated steel board, polyvinyl chloride sol coated steel boards, aluminum boards and copper boards.

Examples of the three-dimensional object include columnar objects and objects of other configurations made up of the various kinds of material listed for the above-mentioned boards. For example, columnar woods, three-dimensional resin moldings and the like are mentioned.

The decorative material is a decorative sheet when the substrate is a sheet. More particularly, when the sheet, which is a substrate, is paper, the decorative material is a decorative paper. Moreover, when the substrate is a board, it is a decorative board and when the substrate is a three-dimensional object, the decorative material is a decorative member or a decorative product.

[Intermediate Resin Layer]

The intermediate resin layer 2 is a resin layer which is disposed between the substrate 1 and the surface decorative layer 3 and, in the present invention, whose dynamic viscoelastic characteristic is specified. The resin to be used for the intermediate resin layer may be, with no particular limitations, any resin which satisfies the above-mentioned dynamic viscoelastic characteristic specified in the present invention. For example, it may be either thermoplastic resin or curable resin. It, therefore, is recommended to use, as the resin of the intermediate resin layer, a resin satisfying the specific dynamic viscoelastic characteristic according to application and physical properties required after a suitable selection from known resin materials.

As for the dynamic viscoelastic characteristic of the intermediate resin layer, the abrasion resistance of a decorative material produced by a surface protective layer can be enhanced by at least allowing loss elastic modulus E" (or a temperature dependency characteristic thereof) to have a peak under room temperature. On the other hand, as for the surface hardness the surface of a decorative material is usually required to have, a surface protective layer itself in which a crosslinked resin is used can exhibit an effect to some extent. If allowing loss elastic modulus E" to have a peak under room temperature makes the intermediate resin layer too soft in the room temperature region, affecting the surface hardness to lower it, the shortage produced can be compensated by means of further specifying the dynamic viscoelastic characteristic of the intermediate resin layer so that the value of storage elastic modulus E' at room temperature falls within a specific range. Furthermore, in addition to this, allowing the loss elastic modulus E" to have another peak over room temperature can make it easier to bring the values of the storage elastic modulus E' at room temperature within a specific range. Alternatively, it is also possible to bring the values of the storage elastic modulus E' at room temperature by allowing the loss elastic modulus E" to have a peak over room temperature (in addition to another peak under room temperature) without specifying the storage elastic modulus E'.

The storage elastic modulus E' is preferably brought within the range of from $1 \times 10^7$ to $2 \times 10^9$ Pa and is more preferably brought within a more desirable range of from $2 \times 10^7$ to $2 \times 10^9$ Pa. This is because a storage elastic modulus E' of less than $1 \times 10^7$ Pa will cause the intermediate resin layer to deform in a greater degree and may result in reduction of surface hardness produced by the surface protective layer and in decrease in the effect of improving abrasion resistance.

It is to be noted that such a dynamic viscoelastic characteristic introduces rubber-elastic factors to the intermediate resin layer, but does not make it completely rubber-elastic. The substances generally called rubber only have storage elastic modulus E" less than the above-mentioned range in order. If the intermediate resin layer is too soft like rubber, too much deformation may occur and no abrasion resistance improving effect is obtained.

Incidentally, the temperature dependency characteristics of the loss elastic modulus E" and the storage elastic modulus E' of the intermediate resin layer in the dynamic viscoelasticity method measured at a measuring frequency of 10 Hz can be measured using a commercially available dynamic viscoelasticity measurement apparatus, for example, "Rheogel-E4000" manufactured by UBM. In general, the sample deformation mode is classified, based on the mode of applying force to samples to be measured, into a bend mode, a tensile mode, a twist mode and a shear mode. In the present invention, the tensile mode is used from the consideration to the form of the samples to be measured (a film form). In the practical measurement, the conditions were set as follows:

Vibration applied: sinusoidal wave of a frequency of 10 Hz

Stress: 5 μm

Temperature elevation rate: 3° C./min

Capturing temperature: every 2° C.

Measuring temperature range: from −50° C. to 120° C.

The measuring samples used were prepared by pouring a coating liquid for forming an intermediate resin layer into a weighing dish of polypropylene with a flat bottom and drying it to form a coating film having an intermediate resin layer only. The size of the measuring samples is for example, a rectangle about 100 μm thick, 20 mm long and 5 mm wide. As for the measuring frequency, measurement may inherently be conducted at any frequency as long as the presence of peaks of the temperature dependency of abrasion resistance and loss elastic modulus and a co-relation with the storage elastic modulus can be clarified and the measurement can be conducted easily. However, the present invention adopts a measuring frequency of 10 Hz since the measurement at a frequency of 10 Hz has spread in the organic macromolecule field, it is easy to get measurement apparatus and the co-relation with abrasion resistance actually becomes clear at a frequency of 10 Hz.

It is probably possible to adopt a relationship between a so-called glass transition temperature Tg and room temperature Tr ($Tg \leq Tr$) as an index of softness of a resin at room temperature (region), this does not permit accurate product design. This is because, based on a variety of tests and studies, the loss elastic modulus E" and the storage elastic modulus E' by the dynamic viscoelasticity method adopted in the present invention are measured under the application of external force as a function of time and, therefore, situations closer to the practical use conditions (of decorative materials) are reflected to the abrasion phenomena caused by the external force, and accordingly, it becomes possible to achieve accurate product design. In contrast, since a glass transition temperature is usually obtained using a DSC (a differential scanning calorimeter) which measures without applying external force, a behavior caused by dynamic external force is not reflected to the measured results. Moreover, generally, a peak temperature of loss elastic modulus does not agree with a glass transition temperature. For example, specifically, a certain resin has a glass transition temperature of 18° C., but a peak temperature of its loss elastic modulus E" under room temperature is 67° C. When the lower limit of room temperature is temporarily defined as 20° C., if a glass transition temperature lower than room temperature is acceptable, this resin will become adoptable. However, this resin can not improve abrasion resistance actually. The fact that the temperature of the peak Pa of the loss elastic modulus of this resin under room temperature is 67° C., which is not lower than room temperature, is reflected actually. "Room temperature" used in the present invention means a temperature at which a decorative material is used and is a ranged temperature, for example, from 0° C. to 70° C. This is because the environmental temperature at which decorative materials are used varies widely depending upon temperature change in the daytime, seasonal variation, and the area in which decorative materials are used (a cold district, subtropics and the like.) Moreover, in general, decorative materials are finally used inside structures such as rooms and vehicles. However, before execution of construction, they are exposed to temperature changes in carriers, warehouses and the like. Including such cases, the "room temperature" means environmental temperatures at which decorative materials are used. Therefore, the "room temperature" should not be defined as only one temperature (for example, 25° C.), but is defined as ranged temperature region. However, it is not necessary to make the temperature region correspond to all temperature changes. It is possible to determine the temperature range of room temperature based on the lower and upper limits of the temperatures which should be considered under the environment where the desired decorative material is employed. The resin for the intermediate resin layer of the present invention is selected according to the designed desired value of the determined temperature range. Accordingly, the maximum and the minimum of room temperature may vary depending upon the application of a decorative material. For example, if a decorative material is used as an interior material of a vehicle, better results can be obtained by determining the characteristics of an intermediate resin layer using room temperature particularly having a relatively higher upper limit than that for indoor applications. Needless to say, if the resin to be used for an intermediate resin layer or its cost permit, the characteristics of the intermediate resin layer may also be determined through setting room temperature such as provides a relatively wide temperature range after taking various applications widely into consideration. Furthermore, in practical product design, both ends of the lower limit or the upper limit may be neglected so that the temperature range is reduced depending upon frequency (possibility) of the occurrence of temperatures to reach the lower limit and the upper limit under the use environment and the strength of abrasion force applied at the time and frequency of each occurrence, from the relationship with cost or the like. For example, in the case of designing for usual indoor applications in Japan, it is recommended to set the lower limit of room temperature to be 10° C. and the upper limit to 50° C. Examples, which will be described later, are those designed according to this room temperature setting.

Incidentally, for making a resin to be adopted for the intermediate layer to have a peak of its loss elastic modulus E" at a temperature under room temperature or to have a peak at a temperature over room temperature, there is a general tendency that use of an aliphatic system as the molecular chain structure of the resin decreases a peak temperature or that use of an aromatic system increases a peak temperature. Moreover, the molecular weight (polymerization degree) of the resin must exceed a certain value (for example, a polymerization degree of 500) for clear appearance of peaks of the loss elastic modulus E". However, it does not have very much to do with a peak temperature. As mentioned above, the loss elastic modulus E" can be controlled at will by molecule designing the molecular chain structure of the resin appropriately.

Moreover, when mixing two resins having different peak temperatures of loss elastic modulus E", microscopically complete mixing of both resins may result in fusion or disappearance of their peaks. However, when the both resins are mixed while being in microscopic phase separation, their peaks may remain at the different temperatures. Therefore, in order to cause the loss elastic modulus E" of the intermediate layer to have both a peak Pa under room temperature and a peak Pb over room temperature, it is also possible to mix two or more kinds of resins. In other words, it is also possible to use a mixed resin in which a resin having a peak Pa under room temperature in its loss elastic modulus E" and a resin having a peak Pb over room temperature in its loss elastic modulus E".

That the resin used for the intermediate resin layer is not particularly limited as long as it satisfies the above-mentioned dynamic viscoelastic characteristic and may, for example, be thermoplastic resins and curable resins was stated previously. Specific examples thereof include thermoplastic resins such as acrylic resin, polyester resin, styrene-butadiene rubber (SBR) and thermoplastic urethane resin and curable resins such as two-component curing type urethane resin, which may be used either alone or as mixtures of two or more of them. Particularly, polyester resin is suitable based on the fact that it is one of the resins easy to be adjusted their dynamic viscoelastic characteristic through the selection of the type and formulation of a polyhydric alcohol and a polybasic acid to be used as raw materials.

It is to be noted that using and crosslinking a curable resin is more desirable than using a thermoplastic resin (or crosslinking and then using as a curable resin is more desirable than using as a thermoplastic resin) because abrasion resistance is improved together with solvent resistance and heat resistance. Although crosslinking can be achieved by known methods, it can be done by using isocyanate as a crosslinking agent or by a method in which by allowing a resin molecular to have an acryloyl group therein (for example, polyesteracrylate resulting from reacting acrylic acid, methacrylic acid or the like with polyester resin (prepolymer) or various kinds of acrylate-based prepolymers) and also using an ionizing-radiation-curing resin of acrylate type or the like for the surface protective layer, the aforesaid acryloyl group is cured simultaneously with the curing of the surface protective layer with iodizing-radiation irradiation. Alternatively, it is also possible to allow a resin molecule to have an active-hydrogen-containing group such as a hydroxyl group therein (for example, various kinds of polyols used as the main component of two-component curing type urethane resin, such as polyester polyol, acrylic polyol, polyether polyol, polycarbonate polyol and polyurethane polyol) or allow it to have an isocyanate group or the like, and to use a urethane resin of two-component curing type or the like for the surface protective layer, thereby curing the intermediate resin layer simultaneously with the curing of the surface protective layer on heat or the like. It is to be noted that since a polyester resin has a remaining hydroxyl group as a reaction residual group, it can be used as a main component of a two-component curing type urethane resin.

The amount of a crosslinking agent to be added varies depending on the resin system, the type of the crosslinking agent and the like, but is usually approximately from 1 to 10 parts by weight based on 100 parts by weight of the resin (the main component).

Examples of isocyanate to be used include polyisocyanates such as aromatic isocyanates, e.g., 2,4-tolylene diisocyanate, xylene diisocyanate, naphthalene diisocyanate, 4,4'-diphenylmethane diisocyanate, or aliphatic (or alicyclic) isocyanates such as 1,6-hexamethylene diisocyanate, isophorone diisocyanate, hydrogenated tolylene diisocyanate and hydrogenated diphenylmethane diisocyanate, etc. Alternatively, adducts or multimers of the above-mentioned isocyanates can be employed. These are exemplified by adducts of tolylene diisocyanate, a trimer of tolylene diisocyanate, adducts of 1,6-hexamethylene diisocyanate, and the like. Aliphatic (or alicyclic) isocyanates are preferable to aromatic isocyanates from the viewpoints of weatherability and heat yellowing resistance.

The intermediate resin layer can be formed by known coating film formation methods such as coating or printing with a coating liquid (or ink) comprising a solution containing the above-mentioned resin dissolved or a dispersing liquid containing the above-mentioned resin dispersed. When the intermediate resin layer is formed on a full surface, it can be formed by coating methods such as gravure coating and roll coating. Alternatively, when it is formed in a pattern or on the full surface, it can be formed by printing methods such as gravure printing, silkscreen printing, offset printing and gravure offset printing. Also in the case of making the coating liquid (or ink) aqueous, isocyanate crosslinking can be achieved by, for example, causing an isocyanate to be a block isocyanate, volatizing and drying water, which is used as a solvent or a dispersing medium, followed by releasing the block of isocyanate on heating.

The thickness of the intermediate resin layer varies depending on applications, physical properties required and the like, but it is usually set to be approximately from 1 to 10 μm as the total thickness in both single-layered structure and multi-layered structure.

Incidentally, when a desired design expression is satisfied by only two layers of the substrate and the surface protective layer, it is also possible to form the intermediate resin layer as a mere colorless transparent resin layer containing no coloring agents or the like. However, in usual, the intermediate resin layer is formed as a layer having functions such as decoration. For example, as illustrated in FIG. 2, the intermediate resin layer maybe formed as a layer combining layers of various kinds of functions other than the improvement in abrasion resistance, such as a sealer layer 4, a pattern layer 5 and a primer layer 6. In the combination with such functional layers, the intermediate resin layer may be combined with one or two or more functional layers. FIG. 1 shows an example of a multilayer structure wherein the intermediate resin layer is combined with three layers.

The sealer layer 4 is a layer which is provided for preventing a coating liquid or an ink from being absorbed into the substrate, resulting in the reduction in the coating thickness or for preventing a coating film or a ink film from generating luster unevenness caused by surface unevenness of the substrate when the substrate is made of paper, wood or the like so that its surface becomes a rough surface or shows permeability.

Furthermore, a coloring agent may be added to the intermediate layer (including a layer combined with various kinds of functional layers) to form a colored layer, a concealment layer, a colored concealment layer and the like, which are formed in a full surface.

Moreover, when adding a coloring agent to the intermediate resin layer and also forming the layer in a pattern, it can be formed as a pattern layer. Considering the original purpose of the intermediate resin layer, it is preferable not to form such layers scattered. In the case of a pattern layer of multicolor printing, it is also possible to form a layer lying in almost a full surface or in a full surface without being scattered as a whole as the result of overlapping even if the layers of each color exist separately.

When the intermediate resin layer has a multilayered structure, the layer contacting the surface protective layer can be a layer serving also as a primer layer for enhancing adhesion to the surface protective layer. Such a primer layer is formed also for the purpose of enhancing adhesion between different kinds of layers including the substrate in addition to the purpose of enhancing adhesion to the surface protective layer. Therefore, when the intermediate resin layer in a multilayered structure contacts with the substrate, the layer that contacts with the substrate can be combined with a primer layer to the substrate. Examples of such cases include polyolefin resin sheets, which generally show poor adhesiveness.

Incidentally, the intermediate resin layer is required only to be disposed between the substrate and the surface protective layer. However, when layers other than the intermediate resin layer (for example, a pattern layer, a sealer layer and the like not combined with the intermediate resin layer) are also disposed between the substrate and the surface protective layer, it is desirable that the intermediate resin layer is either a layer disposed immediately below the surface protective layer with being contact with the surface protective layer or a layer dispose closer to the surface protective layer since a cushion effect due to the intermediate resin layer is given directly to the surface protective layer. Therefore, for example, a patter layer that is not combined with the intermediate resin layer is preferably disposed between the intermediate resin layer and the substrate. In this case, if the adhesion is poor when the pattern layer and the surface protective layer directly contact, it is also possible to consider the intermediate resin layer to be a primer layer binding the pattern layer and the surface protective layer.

Unless the expression of the previously mentioned specific loss elastic modulus and storage elastic modulus are inhibited, known additives such as extenders, e.g., silica, calcium carbonate and barium sulfate, ultraviolet absorbers such as benzotriazole, benzophenone and fine particle cerium oxide, light stabilizers such as hindered amine type radical scavenger, and heat stabilizers may be added to the intermediate resin layer for appropriately adjusting an aptitude for coating, an aptitude for printing and other properties.

Moreover, when a coloring agent is added to the intermediate resin layer to form a patter layer (including a full-surface colored solid layer), known coloring agents can be used as such a coloring agent. For example, inorganic pigments such as titanium white, zinc white, carbon black, iron black, iron oxide red, cadmium red, chrome yellow, titanium yellow, cobalt blue and ultramarine blue, organic pigments such as aniline black, quinacridon red, polyazo red, isoindolinone yellow, benzidine yellow, phthalocyanine blue and indanthrene blue, glittering pigments such as titanium dioxide-coatedmica, shell and scale-like powders of brass, aluminum and the like, or other dyes.

Any pattern is available as patterns to be expressed with a pattern layer combined with the intermediate resin layer or with a pattern layer not combined with the intermediate resin layer. Examples of such a pattern include a woodgrain pattern, a stonegrain pattern, a texture pattern, a tile-like pattern, a brick-like pattern, a leather grain patter, sand grain pattern, an aventurine pattern, characters, symbols and a geometrical pattern, etc.

In the case of pattern layers not combined with the intermediate resin layer, known resins may appropriately be employed as a binder resin depending upon physical properties required such as adhesiveness to other layers. For example, a single substance selected from or a mixture containing substances selected from cellulose-type resins such as nitrocellulose, cellulose acetate and cellulose acetate propionate, urethane resin, acrylic resin, vinyl chloride-vinyl acetate copolymers, polyester resin, alkyd resin and the like is used.

[Surface Protective Layer]

The surface protective layer 3 is a layer that becomes an outermost surface layer and may be formed of a thermoplastic resin. However, the surface protective layer is preferably formed of a curable resin that can produce a crosslinked resin since it can achieve good abrasion resistance. As such a curable resin, any known resin can be used and, for example, ionizing-radiation-curing resins, two-component curing type urethane resins, epoxy resins, melamine resins and the like can be used. The surface protective layer can be formed by known coating methods such as roll coating and gravure roll coating using a coating liquid comprising one or two or more resins selected from the above-recited resins. Alternatively, it may also be formed by full-surface solid printing using known printing methods such as gravure printing and silkscreen printing. The thickness of the surface protective layer depends upon application, physical properties required and the like, but it is approximately from 1 to 30 μm.

The above-mentioned ionizing-radiation-curing resin is a composition cruable by crosslinking with ionizing radiation. Specifically, compositions which result from suitable mixing of a prepolymer (including so-called oligomer) and/or monomer having a radical polymerizable unsaturated bond or a cationic polymerizable functional group in the molecule and which are curable with ionizing radiation are preferably employed. Such propolymer and/or monomer is used as a single substance or a mixture of two or more sorts.

The aforesaid prepolymer or monomer comprises a compound having in its molecule a radical polymerizable unsaturated bond such as a (meth)acryloyl group and a (meth)acryloyloxy group, a cationic polymerizable functional group such as an epoxy group, and the like. In addition, polyene/thiol-type prepolymers resulting from combination of polyene and polythiol can also be desirably used. It is to be noted that, for example, the (meth)acryloyl group indicates an acryloyl group or a methacryloyl group.

As a prepolymer having a radical polymerizable unsaturated group, polyester (meth)acrylate, urethane (meth)acrylate, epoxy (meth)acrylate, melamine (meth)acrylate, triazine (meth)acrylate, silicon (meth)acrylate, etc. can be used. Those having a molecular weight of approximately from 250 to 100,000 are used.

Examples of the monomer having a radical polymerizable unsaturated group include monofunctional monomers such as methyl (meth) acrylate, 2-ethylhexyl (meth) acrylate and phenoxyethyl (meth)acrylate as a single organic-functions monomer and polyfunctional monomers such as diethylene glycol di(meth)acrylate, propylene glycol di(meth)acrylate, hexanediol di(meth)acrylate, trimethylolpropane tri(meth) acrylate, trimethylolpropane ethylene oxide tri(meth)acrylate, pentaerythritol tetra(meth)acrylate, dipentaerythritol tetra(meth)acrylate, dipentaerythritol penta (meth) acrylate and dipentaerythritol hexa (meth) acrylate.

Examples of the propolymer having a cationic polymerizable functional group include epoxy resins such as bisphenol-type epoxy resins and novolak-type epoxy resins, prepolymers of vinyl ether resins such as fatty acid-type vinyl ethers and aromatic type vinyl ethers.

Example of thiol include polythiols such as trimethylolpropane trithioglycolate and pentaerythritol tetrathioglycolate. Examples of polyene include products resulting form addition of allyl alcohol to both ends of polyurethanes made up of a diol and a diisocyanate.

Furthermore, when conducting crosslinking and curing with ultraviolet rays or visible rays, a photopolymerization initiator is further added to the above-mentioned ionizing-radiation curing resin. For resins having a radical polymerizable unsaturated group, an acetophenone, a benzophenone, a thioxanthone, benzoin and a benzoin methyl ether are used alone or after mixing as a photopolymerization initiator. For resins having a cationic polymerizable functional group, an aromatic diazonium salt, an aromatic sulfonium salt, an aromatic iodonium salt, a metallocene compound, a benzoin sulfonate, etc. can be used alone or in the form of mixture as a photopolymerization initiator. The amount of these photopolymerization initiators to be added is approximately from 0.1 to 10 parts by weight based on 100 parts by weight of an ionizing-radiation curing resin.

As the ionizing radiation, electromagnetic waves or charged particles which have energy sufficient to cause molecules in ionizing radiation-curable resins (compositions) to cure. Although the usually used is ultraviolet radiation or electron beam, it is also possible to use visible radiation, X-ray, charged particle beam, etc. As an ultraviolet radiation source, light sources such as an extra-high pressure mercury vapor lamp, a high pressure mercury vapor lamp, a low pressure mercury vapor lamp, a carbon arc light, a black light and a metal halide lamp and the like are used. As wavelength of ultraviolet radiation, a wavelength region of from 190 nm to 380 nm is usually mainly used. Electron beam sources usable herein include various electron beam accelerators, such as a Cockcroft-Walton accelerator, a van de Graaff accelerator, a resonance transformer accelerator, an insulated core transformer accelerator, a linear accelerator, a Dyamitron accelerator, and a high frequency accelerator. What is used can irradiate electrons having an energy of 100 to 10000 keV, preferably 100 to 300 keV.

Moreover, to the above-mentioned ionizing radiation-curable resins, it is also possible to add thermoplastic resins such as vinyl chloride-vinyl acetate copolymer, vinyl acetate resin; acrylic resin and cellulose resin as needed.

Furthermore, to the above-mentioned ionizing radiation-curable resins, it is also possible to further add various additives. Examples of such additives include extenders (fillers) comprising fine particles of calcium carbonate, barium sulfate, silica, alumina and the like, coloring agents such as dyes and pigments.

Moreover, the decorative material of the present invention does not need abrasion reducing agents since it has an improved abrasion resistance due to the intermediate resin layer. However, when a better abrasion resistance is required and the influences of a rough feeling of surfaces, abrasion of doctors, abrasion of boards and the like can be neglected, abrasion reducing agents comprising hard inorganic particles such as alumina (α-alumina, etc.), silica, glass, silicon carbide, boron carbide and diamond, lubricants such as silicon resin, silicon oil, fluororesin, fluorine-modified resin, vegetable wax, montan wax and paraffin wax may also be added to the resin of the surface protective layer.

The abrasion reducing agent is an additive by a physical approach whose particle itself has a hardness (for example, Vickers hardness) greater than that of the resin of the surface protective layer and which imparts the surface protective layer. resistance to external stress through such a hardness to improve abrasion resistance.

The lubricant is an additive by a physical chemical approach which reduces a coefficient of dynamic or static friction to improve abrasion resistance.

The surface protective layer can be formed by applying a coating liquid containing a resin such as those mentioned above by conventionally known coating methods such as roll coating and flow coating. Alternatively, it can be formed by full-surface printing by conventionally known printing methods such as gravure printing.

[Adherend Substrate]

The decorative material (especially, those in the form of decorative sheet such as decorative paper) of the present invention is used as surface decorative materials for being stuck on surfaces of a various kinds of adherend substrates.

The adherend substances have no particular limitations. For example, the material of such adherend substrates include materials of inorganic nonmetallic type, metallic type, woody type, resin type, etc. Specifically, those of the inorganic nonmetallic type include inorganic materials such as those of non-pottery ceramic industry type, e.g., paper-made cement, extruded cement, slag cement, ALC (auto-claved lightweight concret) and GRC (glass fiber reinforced concrete), pulp cement, woodchip cement, asbestos cement, calcium silicate, plaster and plaster slag, and ceramics, e.g., terra-cotta, earthenware, porcelain, stoneware, glass and enameled ware. Those of the metallic type include metallic materials such as iron, aluminium and copper. Those of the woody type include veneers, plywoods, particle boards, fiberboards, laminate woods, etc. made of Japan cedar, hinoki, oak, lauan, teak, etc. Those of the resin type include polypropylene, ABS resin and phenol resin.

The adherend substrate may have any configuration and, for exampl, flat paltes, curved boards and multi-cornered prisms are available.

[Application]

The decorative material of the present invention has no particular limitations in its application and is used for building interior materials such as walls, floors and ceilings, fixtures such as doors, door frames and window frames, fittings such as ceiling cornices and plinthes and furniture such as wardrobes and cabinets.

EXAMPLES

Hereafter, the present invention is further described by reference to Examples and Comparative Examples.

Example 1

Figure 3:
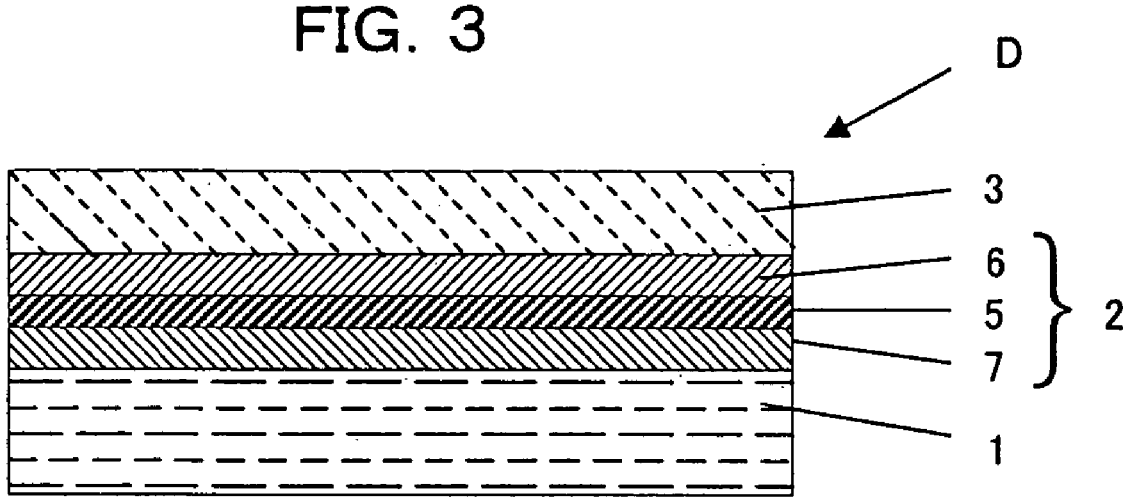
FIG. 3 is a sectional view illustrating still another embodiment of the decorative material of the present invention.

For test and evaluation, decorative material D, which will be processed to a decorative paper of a structure shown in FIG. 3, was prepared as follows.

First, on one side of an unbleached tissue paper (unimpregnated paper) having a weight of 30 g/m² as a substrate 1, an intermediate layer 2 comprising three layers, a white colored solid layer 7 (it is also a full-surface solid layer in a pattern layer), a pattern layer 5 having a full-surface red pattern and a primer layer 6, was formed through applying the layers with a Meyer bar sequentially from the substrate in application amounts (on solid basis, hereafter the same) of 5 g/m², 2 g/m² and 2 g/m², respectively. The three layers contained the same resin component. The resin used was, as shown in Table 1, a two-component curable urethane resin resulting from mixing 3 parts by weight of 1,6-hexamethylene diisocyanate (HMDI) adduct as an isocyanate-based crosslinking agent and 100 parts by weight of a main component comprising a mixed resin of a (saturated) polyester resin (containing hydroxyl groups) [in the Table, this is abbreviated PES; hereinafter, [ ] at each occurrence is the same] and an unsaturated polyester resin (containing hydroxyl groups) [U-PES] in a weight ratio of 4 to 6.

As for a single-layered film of the resin formed in a weighing dish of polypropylene resin, the dynamic viscoelastic characteristics of the above-mentioned resin (in this case, a crosslinked cured resin) were measured using a dynamic viscoelasticity measurement apparatus (manufactured by UBM, "Rheogel-E4000"). The measurement was carried out in tensile mode while being vibrated in a 10 Hz sinusoidal wave under the measuring conditions: a stress of 5 μm, a temperature elevation rate of 3° C./min, a capturing temperature of every 2° C., and a measuring temperature range of −50° C. to 120° C. As the result, the temperature dependency characteristic of loss elastic modulus E" had a peak at −14° C., which is under room temperature (in a series of decorative materials prepared, from 10° C. to 50° C. was defined as room temperature) and also had another peak at 90° C., which is over room temperature. Moreover, storage elastic modulus E' was $7 \times 10^7$ to $2 \times 10^8$ Pa in the above-mentioned room temperature range.

Furthermore, a paint comprising an electron beam curable resin composed of 20 parts by weight of four-functional urethane acrylate prepolymer, 40 parts by weight of three-functional urethane acrylate prepolymer and 40 parts by weight of polyester acrylate oligomer was applied to the intermediate layer 2 with a Meyer bar so that its application amount became 5 g/m2, and subsequently the coating was crosslinked and cured by the irradiation of electron beam under the conditions of 175 keV(s) and 30 kGy (3 Mrad), thereby forming a surface protective layer 3 comprising a cured resin to yield decorative material D.

Example 2

A decorative material was obtained in the same manner as Example 1 except that in Example 1 the resin of the intermediate layer having the three layer structure serving as a sealer layer, a pattern layer and a primer layer was changed to an aqueous (saturated) polyester resin [aqueous PES] and no crosslinking agent was used. A peak temperature of the loss elastic modulus E" of the above resin at temperatures under room temperature is −31° C. and there are no peaks over room temperature. A value of storage elastic modulus E' in the room temperature range was $2 \times 10^7$ to $2 \times 10^8$ Pa.

Example 3

A decorative material was obtained in the same manner as Example 1 except that in Example 1 only the main component was used and a crosslining agent was not used as a resin of an intermediate layer as shown in Table 1. A peak temperature of the loss elastic modulus E" of the resin (the non-crosslinked thermoplastic resin) at temperatures under room temperature became −10° C. and a peak temperature over room temperature became 6° C. A value of storage elastic modulus E' in the room temperature range was $2 \times 10^7$ to $2 \times 10^8$ Pa.

Example 4

A decorative material was obtained in the same manner as Example 1 except that in Example 1, as a resin of an intermediate layer only a (saturated) polyester resin [PES] (the cross linking agent was incorporated) was used as shown in Table 1. A peak temperature of the loss elastic modulus E" of the resin (the crosslinked resin) at temperatures under room temperature became −10° C. and there was no peak at temperatures over room temperature. A value of storage elastic modulus E' in the room temperature range was $1 \times 10^7$ to $2 \times 10^7$ Pa.

Example 5

A decorative material was obtained in the same manner as Example 1 except that in Example 1, as a resin of an intermediate layer an acrylic resin [AC (A)] (no crosslinking agent was used) was used as shown in Table 1. A peak temperature of the loss elastic modulus E" of the resin (thermoplastic resin) at temperatures under room temperature became 6° C. and there was no peak at temperatures over room temperature. A value of storage elastic modulus E' in the room temperature range was $2 \times 10^8$ to $2 \times 10^9$ Pa.

Example 6

A decorative material was obtained in the same manner as Example 1 except that in Example 1, in place of the electron beam curable resin [EB] as a resin of a surface protective layer, a two-component urethane resin [2-component PU] was used, the resin resulting from the incorporation of 12 parts by weigh of a crosslinking agent, the HMDI adduct, to 100 parts by weight of the main component, urethane polyol.

Comparative Example 1

A decorative material was obtained in the same manner as Example 1 except that in Example 1, as a resin of an intermediate layer, a mixed resin composed of an acrylic resin [AC (B)] (having a composition of resin different from that of the acrylic resin used in Example 5) and a vinyl chloride-vinyl acetate copolymer [VC-VA] in a weight ratio of 5 to 5 (no crosslinking agent was used) was used as shown in Table 1. The loss elastic modulus E" of the mixed resin (thermoplastic resin) had no peaks at temperatures under room temperature, but there was a peak at 51° C., which is over room temperature. A value of storage elastic modulus E' in the room temperature range was $6 \times 10^8$ to $2 \times 10^9$ Pa.

Comparative Example 2

A decorative material was obtained in the same manner as Example 1 except that in Example 1, as a resin of an intermediate layer, an acrylurethane resin [ACU] was used (no crosslinking agent was used) as shown in Table 1. The loss elastic modulus E" of the resin (thermoplastic resin) had no peaks at temperatures under or over room temperature, but there was a peak within the room temperature range (at 31° C. A value of storage elastic modulus E' in the room temperature range was $2 \times 10^7$ to $1 \times 10^9$ Pa.

Comparative Example 3

A decorative material was obtained in the same manner as Example 1 except that the formation of an intermediate layer was omitted.

TABLE 1

| | | Content of intermediate layer and evaluation results | | | | | | |
|---|---|---|---|---|---|---|---|---|
| | | Intermediate layer | | | | | Evaluation result | |
| | | | | Dynamic viscoelastic characteristics | | Resin of | Abrasion | |
| | | Composition of resin *1 | | E" peak | E" peak | Value of E' | surface | resistance |
| | | Main component | Crosslinking agent | (<room temperature) | (>room temperature) | (in room temperature range) | protective layer *2 | evaluation and loss (mg) | Solvent resistance |
| Examples | 1 | PES/U-PES = 4/6 | NCO 3% | −14° C. | 90° C. | $7 \times 10^7$–$2 \times 10^8$ Pa | EB | ○(11) | ○ |

TABLE 1-continued

Content of intermediate layer and evaluation results

| | | Intermediate layer | | | | | Evaluation result | | |
|---|---|---|---|---|---|---|---|---|---|
| | | Composition of resin *1 | | Dynamic viscoelastic characteristics | | | Resin of surface protective layer *2 | Abrasion resistance evaluation and loss (mg) | Solvent resistance |
| | | Main component | Crosslinking agent | E" peak (<room temperature) | E" peak (>room temperature) | Value of E' (in room temperature range) | | | |
| | 2 | Aqueous PES | None | −31° C. | NONE | $2 \times 10^7$–$2 \times 10^8$ Pa | EB | ○(14) | X |
| | 3 | PES/U-PES = 4/6 | None | −10° C. | 60° C. | $1 \times 10^7$–$2 \times 10^8$ Pa | EB | ○(14) | X |
| | 4 | PES | NCO 3% | −10° C. | NONE | $1 \times 10^7$–$2 \times 10^7$ Pa | EB | ○(9) | ○ |
| | 5 | AC(A) | NONE | 6° C. | NONE | $2 \times 10^8$–$2 \times 10^9$ Pa | EB | ○(11) | X |
| | 6 | PES/U-PES = 4/6 | NCO 3% | −14° C. | 90° C. | $7 \times 10^7$–$2 \times 10^8$ Pa | 2-comp. PR | ○(9) | ○ |
| Comparative Examples | 1 | AC(B)NC-VA = 5/5 | NONE | NONE | 51° C. | $6 \times 10^8$–$2 \times 10^9$ Pa | EB | X(31) | X |
| | 2 | ACU | NONE | NONE *3 | NONE | $2 \times 10^7$–$1 \times 10^9$ Pa | EB | X(18) | X |
| | 3 | | | No intermediate layer | | | EB | X(16) | X |

*1: PES = polyester resin (containing hydroxyl group); U-PES = unsaturated polyester resin; aqueous PES = aqueous polyester resin; AC = acrylicresin [(A) and (B) are different in composition of resin]; VC-VA = vinyl chloride-vinyl acetate copolymer; ACU = acryl urethane resin; NCO (crosslinking agent) = adduct of 1,6-hexamethylene diisocyanate (HMDI)
*2: EB = Electron beam curable resin; 2-comp PU = two-component curable urethane resin
*3: There is a peak at 31° C. within the room temperature range.

[Performance Evaluation]

Each of the decorative materials of Examples and Comparative Examples was stuck on a 3 mm thick Chinese veneer board, which was used as a woody substrate as an adherend substrate, with a double-sided adhesive tape to form a decorative panel, which was then evaluated. The evaluation was performed about abrasion resistance and solvent resistance in the following procedures.

(1) Abrasion resistance : Abrasion resistance was evaluated according to JIS K 6902 "Testing method for laminated thermosetting high-pressure decorative sheets" and the abrasion resistance test of NEMA Standard. Specifically, using a Taber's abrader (manufactured by Toyo Seiki Seisaku-Sho, Ltd.), two abrasion losses [mg] after 10 rotations were measured using S42 abrasive paper by 9.81 N (1 kgf) of both wheels loads. The evaluation was done based on the average of the measurements.

(2) Solvent resistance : The surface of the surface protective layer of a decorative sheet was rubbed back and forth 200 times with a gauze containing methyl ethyl ketone under a load of 0.981 N (100 gf) and appearance change of the decorative material caused by the solvent was visually observed. A sample showing no change is judged good and that showing some changes is judged poor.

As the results of the above evaluation, the abrasion resistances in all Examples were good as shown in Table 1. However, those in all Comparative Examples were poor. Namely, in Comparative Example 3, there was no intermediate resin layer. In Comparative Example 2, even there was an intermediate resin layer and its storage elastic modulus E' was $1 \times 10^7$ to $2 \times 10^9$ Pa in the room temperature range, the important loss elastic modulus E" had no peaks under room temperature. In Comparative Example 1, the loss elastic modulus E" had a peak, but the peak existed only in the temperature range over room temperature.

On the other hand, although in all of the Examples and Comparative Examples the surface protective layers were formed of a crosslinked resin, the solvent resistance was poor in Examples 2, 3, 5 and Comparative Examples 2 and 3 where the intermediate layers were formed of thermoplastic resin. However, it was good in Examples 1, 4 and 6 where the intermediate layers were formed of crosslinked resin. Therefore, it is shown that it is desirable to form an intermediate layer of a crosslinked resin for applications where solvent resistance is required as well as abrasion resistance.

What is claimed is:

1. A decorative material comprising an intermediate resin layer and a surface protective layer including a crosslinked resin, the layers being laminated in this order on a substrate, wherein the temperature dependency characteristics at a measuring frequency of 10 Hz of loss elastic modulus determined by a dynamic viscoelasticity method of the intermediate resin layer has a peak at a temperature lower than 10 degrees Celsius, while the intermediate resin layer is in contact with the surface protective layer, and further, the surface protective layer is formed of a curable resin while a thickness of the surface protective layer is in a range of 1 to 30 μm.

2. The decorative material according to claim 1, wherein the value of storage elastic modulus determined by a dynamic viscoelasticity method of the intermediate resin layer at a measuring frequency of 10 Hz is $1 \times 10^7$ to $2 \times 9^9$ Pa at a temperature in the range of 10 to 50 degrees Celsius.

3. A decorative material comprising an intermediate resin layer and a surface protective layer including a crosslinked resin, the layers being laminated in this order on a substrate, wherein the temperature dependency characteristics at a measuring frequency of 10 Hz of loss elastic modulus determined by a dynamic viscoelasticity method of the intermediate resin layer has a first peak at a temperature lower than 10 degrees Celsius and a second peak higher than 50 degrees Celsius, and further, the surface protective layer is formed of a curable resin while a thickness of the surface protective layer is in a range of 1 to 30 μm.

4. The decorative material according to claim 3, wherein the intermediate resin layer is in contact with the surface protective layer.

* * * * *